United States Patent
Narasimha et al.

(10) Patent No.: US 10,255,888 B2
(45) Date of Patent: Apr. 9, 2019

(54) MERGING MULTIPLE EXPOSURES TO GENERATE A HIGH DYNAMIC RANGE IMAGE

(71) Applicant: Texas Instruments Incorporated, Dallas, TX (US)

(72) Inventors: Rajesh Narasimha, Plano, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

(21) Appl. No.: 14/098,230

(22) Filed: Dec. 5, 2013

(65) Prior Publication Data

US 2014/0152694 A1    Jun. 5, 2014

Related U.S. Application Data

(60) Provisional application No. 61/733,513, filed on Dec. 5, 2012.

(51) Int. Cl.
| | |
|---|---|
| *G09G 5/377* | (2006.01) |
| *G06T 5/00* | (2006.01) |
| *G06T 5/50* | (2006.01) |

(52) U.S. Cl.
CPC ............ *G09G 5/377* (2013.01); *G06T 5/008* (2013.01); *G06T 5/50* (2013.01); *G06T 2207/10144* (2013.01); *G06T 2207/20012* (2013.01); *G06T 2207/20021* (2013.01); *G06T 2207/20208* (2013.01)

(58) Field of Classification Search
CPC ............................. G09G 5/14; G09G 2340/10
USPC ........................................................ 345/629
See application file for complete search history.

(56) References Cited

U.S. PATENT DOCUMENTS

| | | | |
|---|---|---|---|
| 2007/0242900 A1* | 10/2007 | Chen | .................... G06T 5/50 |
| | | | 382/294 |
| 2008/0056707 A1* | 3/2008 | Ovsiannikov | ..... H01L 27/14625 |
| | | | 396/375 |

(Continued)

OTHER PUBLICATIONS

Jacobs, K., Loscos, C., Ward, G., Automatic high-dynamic range image generation for dynamic scenes, IEEE Computer Graphics and Applications 28, 84-93, 2008.*

(Continued)

*Primary Examiner* — Jin Ge
(74) *Attorney, Agent, or Firm* — Michelle F. Murray; Charles A. Brill; Frank D. Cimino (57) ABSTRACT

A method of generating a high dynamic range (HDR) image is provided that includes capturing a long exposure image and a short exposure image of a scene, computing a merging weight for each pixel location of the long exposure image based on a pixel value of the pixel location and a saturation threshold, and computing a pixel value for each pixel location of the HDR image as a weighted sum of corresponding pixel values in the long exposure image and the short exposure image, wherein a weight applied to a pixel value of the pixel location of the short exposure image and a weight applied to a pixel value of the pixel location in the pixel long exposure image are determined based on the merging weight computed for the pixel location and responsive to motion in a scene of the long exposure image and the short exposure image.

15 Claims, 10 Drawing Sheets

(56) References Cited

U.S. PATENT DOCUMENTS

| | | | | |
|---|---|---|---|---|
| 2009/0087173 | A1* | 4/2009 | Li | H04N 5/23248 396/55 |
| 2009/0180704 | A1* | 7/2009 | Wey | G06T 5/50 382/254 |
| 2011/0229019 | A1 | 9/2011 | Batur et al. | |
| 2011/0292242 | A1* | 12/2011 | Imai | H04N 5/23216 348/229.1 |
| 2012/0008005 | A1* | 1/2012 | Fukunishi | H04N 5/145 348/222.1 |
| 2012/0050557 | A1* | 3/2012 | Atanassov | H04N 5/35581 348/222.1 |
| 2012/0127076 | A1* | 5/2012 | Song | G06F 3/038 345/166 |
| 2012/0262600 | A1* | 10/2012 | Velarde | H04N 5/2355 348/223.1 |
| 2012/0288192 | A1* | 11/2012 | Heidrich | G06T 5/005 382/167 |
| 2013/0286246 | A1 | 10/2013 | Matsuoka | |

OTHER PUBLICATIONS

Masaaki Sasaki et al, "R33 A Wide Dynamic Range CMOS Image Sensor with Multiple Exposure Time Signals and Column-Parallel Cyclic A/D Converters", Proc. IEEE Workshop on Charge-Coupled Devices and Advanced Image Sensors, pp. 218-221, Jun. 9-11, 2005, Karuizawa, Nagan, Japan.

\* cited by examiner

MERGING MULTIPLE EXPOSURES TO GENERATE A HIGH DYNAMIC RANGE IMAGE

CROSS-REFERENCE TO RELATED APPLICATIONS

This application claims benefit of U.S. Provisional Patent Application Ser. No. 61/733,513 filed Dec. 5, 2012, which is incorporated herein by reference in its entirety. This application may be related to co-pending U.S. patent application Ser. No. 14/098,243, filed Dec. 5, 2013, which is incorporated herein by reference in its entirety.

BACKGROUND OF THE INVENTION

Field of the Invention

Embodiments of the present invention generally relate to merging multiple exposures of a scene to generate a high dynamic range image.

Description of the Related Art

The demand for higher dynamic range is a driving force for various imaging applications such as, for example, security cameras and automobile cameras. Imaging devices such as video cameras may be equipped with high dynamic range (HDR) sensors. Non-HDR cameras take photographs with a limited exposure range, resulting in the loss of detail in bright or dark areas. Some HDR imaging devices may compensate for this loss of detail by capturing two or more images at different exposure levels and combining the images to produce images a broader tonal range than non-HDR devices. Merging multiple exposures preserves both the saturated and the shadow regions and thus provides a higher dynamic range than a single exposure.

There are several known techniques for generating an HDR image (also referred to as a wide dynamic range (WDR) image) from two or more exposures. In one technique, the exposures may be spatially interleaved. In some techniques, the imaging system merges multiple exposures and provides a native HDR Bayer image with a pixel depth ranging from 12 to 20 bits. In some techniques, the imaging system captures multiple temporally spaced exposures and these exposures are merged to form an HDR image in the imaging device receiving the multiple exposures. Whether the imaging system generates the HDR image or the imaging device generates the HDR image, tone mapping may need to be performed on the HDR image to permit processing of the HDR image in an imaging pipeline with a lesser pixel bit depth, e.g., 10 to 12 bits.

SUMMARY

Embodiments of the invention relate to methods and apparatus for generating a high dynamic range (HDR) image. In one aspect, a method of generating a high dynamic range (HDR) image is provided that includes capturing a long exposure image and a short exposure image of a scene, computing a merging weight for each pixel location of the long exposure image based on a pixel value of the pixel location and a saturation threshold, and computing a pixel value for each pixel location of the HDR image as a weighted sum of corresponding pixel values in the long exposure image and the short exposure image, wherein a weight applied to a pixel value of the pixel location of the short exposure image and a weight applied to a pixel value of the pixel location in the pixel long exposure image are determined based on the merging weight computed for the pixel location of the long exposure image and responsive to motion in a scene of the long exposure image and the short exposure image.

In one aspect, an apparatus configured to generate a high dynamic range (HDR) image is provided that includes means for capturing a long exposure image and a short exposure image of a scene, means for computing a merging weight for each pixel location of the long exposure image based on a pixel value of the pixel location and a saturation threshold; and means for computing a pixel value for each pixel location of the HDR image as a weighted sum of corresponding pixel values in the long exposure image and the short exposure image, wherein a weight applied to a pixel value of the pixel location of the short exposure image and a weight applied to a pixel value of the pixel location in the pixel long exposure image are determined based on the merging weight computed for the pixel location of the long exposure image and responsive to motion in a scene of the long exposure image and the short exposure image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. As used herein, an image may be a single still picture of a scene or may be a frame in a video stream.

In general, embodiments of the invention provide for merging of long exposure images and short exposure images to generate dynamic range (HDR) images. Generation of a merged (HDR) image includes computing weights for pixels of long and short exposure images and computing pixels values for the merged image as the weighted sum of corresponding pixels in the long and short exposure images.

Unless otherwise specified, for simplicity of explanation, embodiments are described herein in which pixels in an HDR image prior to tone mapping are assumed to be 16 bits. One of ordinary skill in the art, having benefit of the disclosure herein, will understand embodiments with differing pixel bit depths, both before and after tone mapping.

Figure 1:
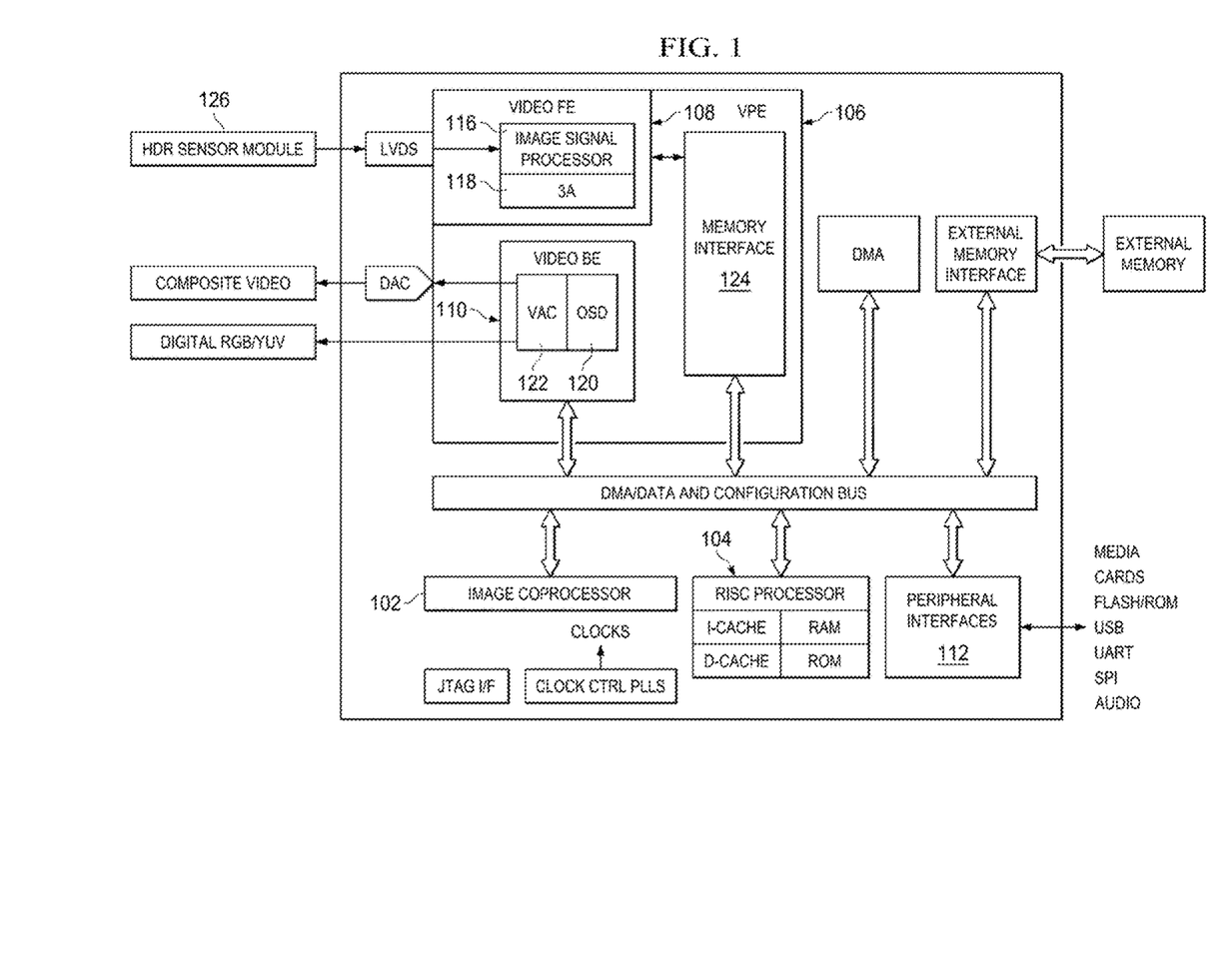
FIG. 1 is a block diagram of a digital system configured to perform local tone mapping on high dynamic range (HDR) images.

FIG. 1 shows a digital system suitable for an embedded system (e.g., a digital camera) configured to perform local tone mapping of an HDR image as described herein. In some embodiments, the digital system is also configured to merge a long exposure image and a short exposure image to generate the HDR image. The digital system includes a DSP-based image coprocessor (ICP) 102, a RISC processor 104, and a video processing engine (VPE) 106 that may be configured to perform noise filtering as described herein. The RISC processor 104 may be any suitably configured RISC processor. The VPE 106 includes a configurable video processing front-end (Video FE) 108 input interface used for video capture from imaging peripherals such as image sensors, video decoders, etc., a configurable video processing back-end (Video BE) 110 output interface used for display devices such as SDTV displays, digital LCD panels, HDTV video encoders, etc, and memory interface 124 shared by the Video FE 108 and the Video BE 110. The digital system also includes peripheral interfaces 112 for various peripherals that may include a multi-media card, an audio serial port, a Universal Serial Bus (USB) controller, a serial port interface, etc.

The Video FE 108 includes an image signal processor (ISP) 116, and a 3A statistics generator 118. The ISP 116 provides an interface to image sensors and digital video sources. More specifically, the ISP 116 may accept raw image/video data from an HDR sensor module 126 (e.g., CMOS or CCD) and can accept YUV video data in numerous formats. The ISP 116 also includes a parameterized image processing module with functionality to generate image data in a color format (e.g., RGB) from raw sensor data. The ISP 116 is customizable for each sensor type and supports video frame rates for preview displays of captured digital images and for video recording modes. The ISP 116 also includes, among other functionality, an image resizer, statistics collection functionality, and a boundary signal calculator. The 3A module 118 includes functionality to support control loops for auto focus, auto white balance, and auto exposure by collecting metrics on the raw image data from the ISP 116 or external memory. In one or more embodiments, the Video FE 108 is configured to perform local tone mapping of an HDR image as described herein. In some embodiments, the Video FE 108 is configured to generate the HDR image by merging a long exposure image and a corresponding short exposure image captured by the sensor module 126.

The Video BE 110 includes an on-screen display engine (OSD) 120 and a video analog encoder (VAC) 122. The OSD engine 120 includes functionality to manage display data in various formats for several different types of hardware display windows and it also handles gathering and blending of video data and display/bitmap data into a single display window before providing the data to the VAC 122 in a color space format (e.g., RGB, YUV, YCbCr). The VAC 122 includes functionality to take the display frame from the OSD engine 120 and format it into the desired output format and output signals required to interface to display devices. The VAC 122 may interface to composite NTSC/PAL video devices, S-Video devices, digital LCD devices, high-definition video encoders, DVI/HDMI devices, etc.

The memory interface 124 functions as the primary source and sink to modules in the Video FE 108 and the Video BE 110 that are requesting and/or transferring data to/from external memory. The memory interface 124 includes read and write buffers and arbitration logic.

The ICP 102 includes functionality to perform the computational operations required for compression and other processing of captured images. The video compression standards supported may include, for example, one or more of the JPEG standards, the MPEG standards, the H.26x standards, and the emerging HEVC standard. In one or more embodiments, the ICP 102 may be configured to perform at least some of the computational operations of local tone mapping of an HDR image. In some embodiments, the ICP 102 may be configured to perform at least some of the computational operations of merging a long exposure image and a short exposure image to generate the HDR image.

In some embodiments, the HDR sensor module 126 is configured to capture HDR images of a scene and provides these images to the VPE 106 at a suitable frame rate, e.g., 30 frames per second (fps). In such embodiments, the HDR sensor module 126 includes one or more suitable imaging sensors, e.g., CCD (charge-coupled device) or CMOS (complementary metal oxide semi-conductor) sensors. In some embodiments, the HDR sensor module is configured to capture a long exposure image and a short exposure image of a scene and provide these exposures to the VPE 106 at a suitable frame rate, e.g., 60 fps. In such embodiments, the HDR sensor module 126 includes one or more suitable imaging sensors, e.g., CCD or CMOS sensors.

In operation, in some embodiments, an HDR image of a scene is captured by the HDR sensor module 124 and provided to the video FE 108. In such embodiments, the Video FE de-compands the HDR image for further processing. In some embodiments, a long exposure image and a short exposure image of a scene are captured by the HDR sensor module 124 and provided to the video FE 108. In the latter embodiments, the video FE 108 merges the two images to form an HDR image of the scene. The merging may be performed as described herein. The video FE 108 converts the HDR image to the input format needed to perform video compression. Prior to the compression, local tone mapping as described herein may be applied to the HDR image as part of processing the image in the image pipeline of the video FE 108. The video data generated by the video FE 108 is stored in the external memory. The video data is then encoded, i.e., compressed. During the compression process, the video data is read from the external memory and the compression computations on this video data are performed by the ICP 102. The resulting compressed video data is stored in the external memory. The compressed video data is then read from the external memory, decoded, and post-processed by the video BE 110 to display the image/video sequence.

Figure 2:
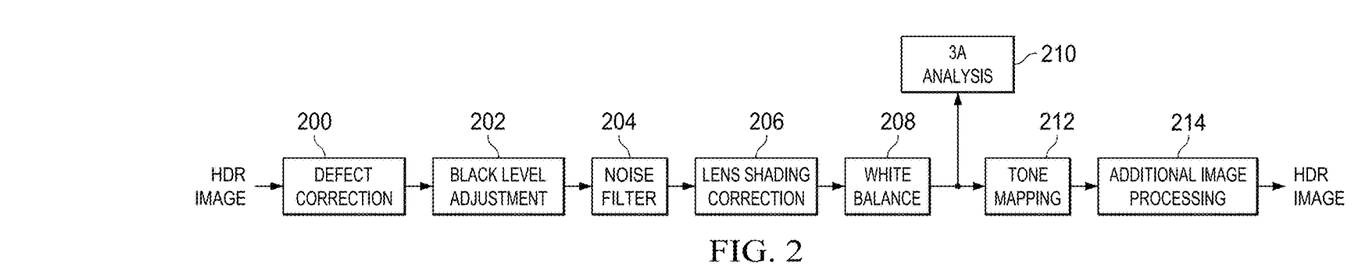
FIG. 2 is a block diagram illustrating data flow of image processing in an embodiment of the digital system of FIG. 1.
Figure 3A:
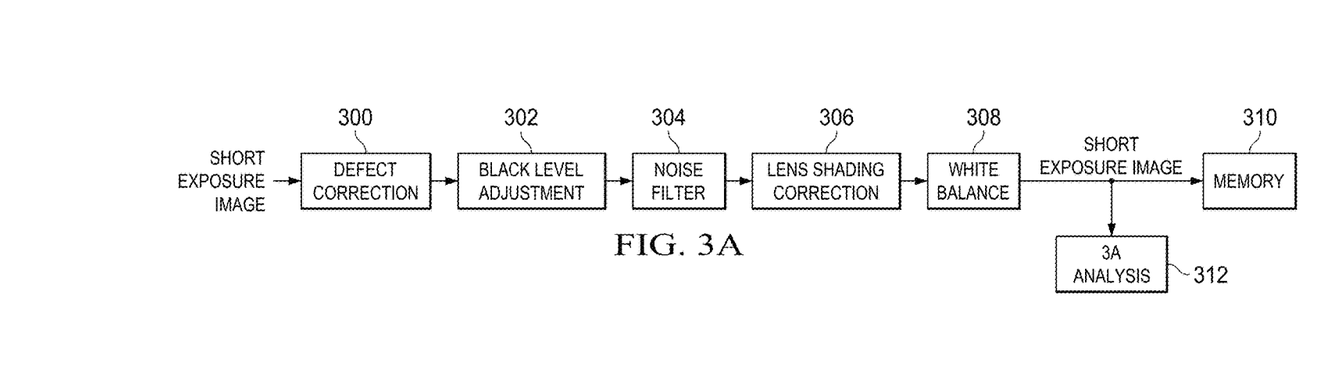
FIGS. 3A and 3B are block diagrams illustrating data flow of image processing in an embodiment of the digital system of FIG. 1.
Figure 3B:
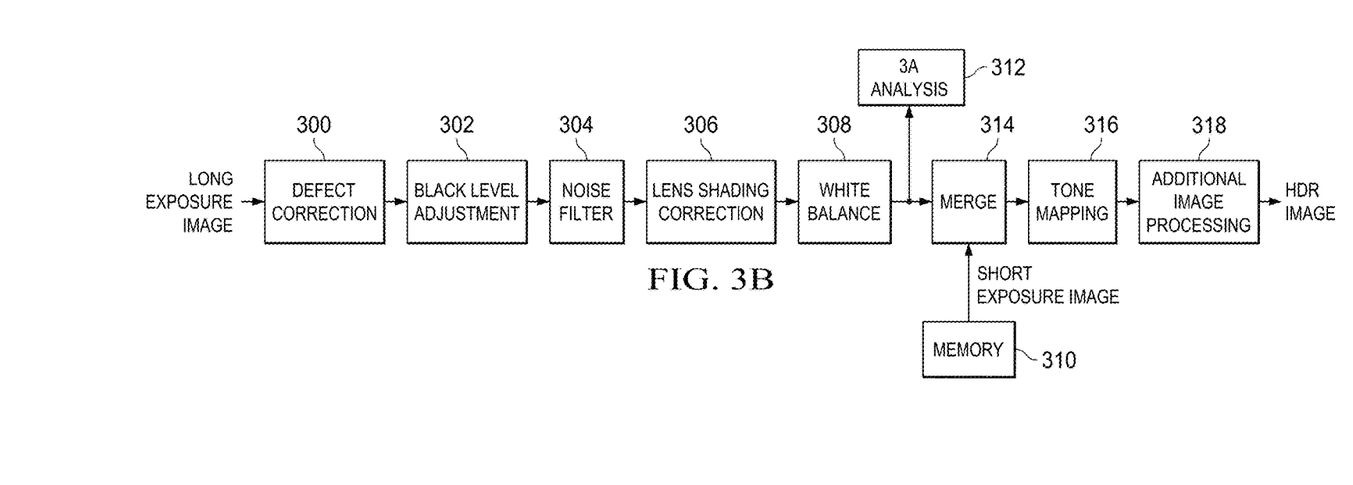

FIG. 2 is a block diagram illustrating data flow of image processing (the "image pipeline") in an embodiment of the digital system of FIG. 1 when the HDR sensor system 126 is configured to capture an HDR image of a scene. FIGS. 3A and 3B are block diagrams illustrating data flow of the image pipeline in an embodiment of the digital system of FIG. 1 when the HDR sensor system 126 is configured to capture a long exposure image and a short exposure image of a scene. One of ordinary skill in the art will understand that similar functionality may also be present in other digital devices (e.g., a cell phone, tablet, PDA, etc.) capable of capturing HDR digital images and/or HDR digital video sequences. While much of the pipeline processing is shown in sequence, one of ordinary skill in the art will understand that image processing is parallel in nature and thus, each component in the pipeline does not necessarily receive an entire digital image before processing can begin. The functionality of many of the image pipeline components is well-known and is not described in detail. Note that input images to the image pipeline are Bayer pattern images. Thus each pixel has only one of four color components—a red component denoted as R, a blue component denoted as B, or one of two green components denoted as Gr and Gb.

As shown in FIG. 2, the HDR image from the HDR sensor module 126 is received by a defect correction component 200. The defect correction component 200 is configured to correct the values of defective pixels in the HDR image. As is well known, an image sensor may have some number of defective pixels which respond to light exposure differently than other pixels due to factors such as manufacturing faults or operating conditions. The correction may be performed using a look-up table (LUT) based technique or any other suitable technique. The defect corrected image is provided to the black level adjustment component 202.

The black level adjustment component 202 is configured to set sensor black to image black in the HDR image. That is, in order to optimize the dynamic range of the pixel values from the HDR sensor module 126, the pixels in the HDR image representing black are corrected since an image sensor may record some non-zero current at these pixel locations. Note that a black pixel should have a value of 0. The black level adjustment component 202 may adjust for this difference by subtracting offsets from each pixel value while clamping/clipping to zero to avoid a negative result. One simple way to calculate this adjustment is to take a picture of complete black, e.g., by leaving on the lens cap or camera cover. A separate black level adjustment value may be used for each color channel. The adjusted HDR image is provided to the noise filter component 204.

The noise filter component 204 is configured to remove various sources of noise in an HDR image, e.g., optical, electrical, digital and power, by averaging similar neighboring pixels. Typically, if the noise level is high, more weight is given to the average of similar neighbors. Conversely, if the noise level is low, more weight is given to the original pixel value. An Optical Electrical Conversion Function (OECF) chart captured using a uniform lighting source may be used to determine the noise level for different intensities. The 12 uniform gray patches on the OECF chart provide 12 power levels, which may then be used to arrange noise using either a linear or square-root model depending on the sensor and gain (or ISO) level. The filtered HDR image is provided to the lens shading correction component 206.

The lens shading correction component 206 is configured to compensate the HDR image for lens shading. Lens shading is the phenomenon that an image is bright in the center and decrease in brightness towards the edge of the field. Lens shading may be caused by factors such as irregularities in the optical properties of a lens associated with a digital image sensor or improper alignment between the Bayer color filter array and the lens. Any suitable technique for lens shading correction may be used. For example, a gain may be applied on a per-pixel basis to compensate for any decrease in brightness. The shading corrected HDR image is provided to the white balance component 208.

The white balance component 208 is configured to adjust the white pixels in an HDR digital image to compensate for color differences introduced by light sources, such as the differences between incandescent, fluorescent, natural light sources, XE strobe, and W-LED flash, as well as mixed light conditions. That is, the illumination during the recording of a scene in a digital image may be different from the illumination when viewing the final digital image. This difference may result in a different color appearance that may be seen, for example, as the bluish appearance of a face or the reddish appearance of the sky. Also, the sensitivity of each color channel varies such that grey or neutral colors may not be represented correctly. Any suitable white balance technique may be used. The white balanced HDR image is provided to both the 3A analysis component 210 (e.g., the 3A statistics generator 118) and the tone mapping component 212.

The 3A analysis component 210 is configured to collect metrics from the HDR image for auto focus, auto white balance, and auto exposure of subsequent images. The tone mapping component 212 is configured to perform a method for local tone mapping on the HDR image as described herein in reference to FIG. 6. The tone mapped image is provided to the remaining components 214 of the image pipeline for further processing to generate the final HDR image. The further processing may include, for example, RGB blending, gamma correction, conversion to the YCbCr color space, edge enhancement, contrast enhancement, and/or false chroma suppression.

As shown in FIG. 3A, the short exposure image from the HDR sensor module 126 is processed by the defect correction component 300, the black level adjustment component 302, the noise filter component 304, the lens shading component 306, and the white balance component 308 of the image pipeline and stored in memory 310. The processed short exposure image is also provided to the 3A analysis component 312. These components operate as described for similarly named components in FIG. 2.

As shown in FIG. 3B, the long exposure image from the HDR sensor module 126 is processed by the defect correction component 300, the black level adjustment component 302, the noise filter component 304, the lens shading component 306, and the white balance component 308 of the image pipeline and is provided to the 3A analysis component 312. These components operate as described for similarly named components in FIG. 2. The processed long exposure image is also provided to the merge component 314. The merge component 314 is configured to merge the long exposure image with the short exposure image stored in the memory 310 to generate an HDR image. The operation of the merge component 314 is described below in more detail in reference to the block diagram of FIG. 4 and the method of FIG. 5. The merged (HDR) image is provided to the tone mapping component 316.

Figure 6:
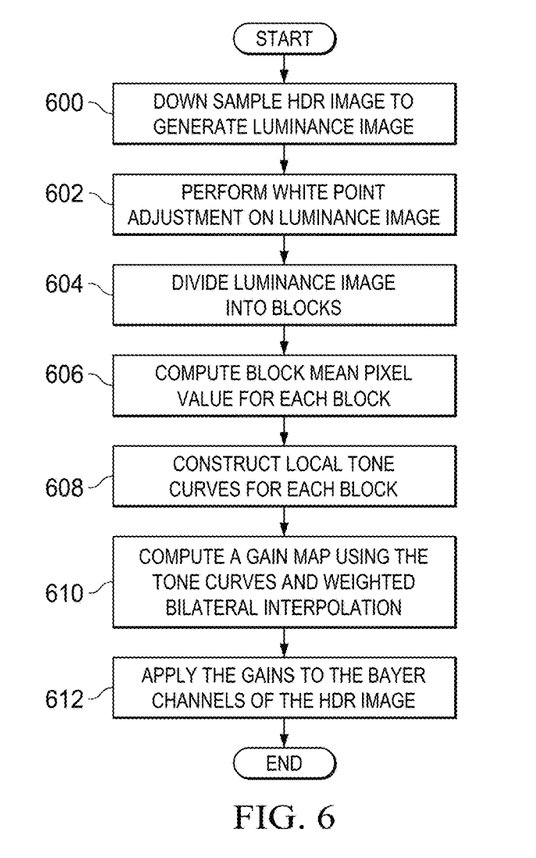
FIG. 6 is a flow diagram of a method for local tone mapping of an HDR image.

The tone mapping component 316 is configured to perform a method for local tone mapping on the HDR image as described herein in reference to FIG. 6. The tone mapped image is provided to the remaining components 318 of the image pipeline for further processing to generate the final HDR image. The further processing may include, for example, RGB blending, gamma correction, conversion to the YCbCr color space, edge enhancement, contrast enhancement, and/or false chroma suppression.

Figure 4:
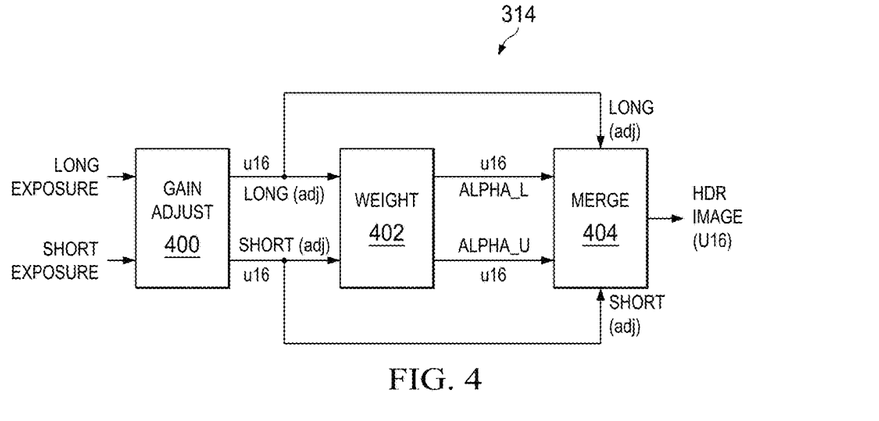
FIG. 4 is a block diagram of a merge component in an embodiment of the digital system of FIG. 1.

FIG. 4 is a block diagram of the merge component 314 of FIG. 3B. The merge component 314 includes a gain adjust component 400, a weight computation component 402, and a merge component 404. The inputs are a long exposure image (processed as described above) and a corresponding short exposure image (processed as described above). The exposure times of the two images may set according to a ratio that is maintained as a power of 2. For example, the exposure time of the short exposure image may be two milliseconds (ms) and the exposure time of the long exposure image may be 31 ms, with a ratio of ceil(31/2)=16. In another example, the exposure time of the short exposure image may be 4 ms and the exposure time of the long exposure image may be 29 ms, with a ratio of ceil(29/4)=8.

In general, the gain adjust component 400 adjusts the gain difference between the long exposure image and the short exposure image. The gain adjustment is described in more detail in reference to the method of FIG. 5.

The weight computation component 402 determines the per-pixel weights that are to be applied to corresponding pixels of the long exposure and short exposure images (after the gain adjustment) to generate the HDR image. The per-pixel weights for the short exposure image and the per-pixel weights for the long exposure image are referred to herein as, respectively, Alpha_U(x,y) and Alpha_L(x,y). In addition, the weight computation component 402 determines motion adaptation weights to be used in the computation of the per-pixel weights for the long exposure image. The motion adaptation weights, the computation of which may be per pixel or block-based, are applied to reduce ghosting artifacts that may be introduced in the merged image due to motion in the scene during the time between capture of the long exposure and short exposure images. Determination of the per-pixel weights and the motion adaptation weights is described in more detail in reference to the method of FIG. 5.

The merge component 404 receives the per-pixel weights for the long exposure and short exposure images and the gain-adjusted images and computes each pixel M(x,y) of the merged image as per $$M(x,y)=y)\times Alpha\_L(x,y)+U(x,y)\times Alpha\_U(x,y))$$

where L(x,y) and U(x,y) are corresponding pixels in, respectively, the long exposure image and the short exposure image, Alpha_L(x,y) is the weight for L(x,y), and Alpha_U(x,y) is the weight for U(x,y).

Figure 5:
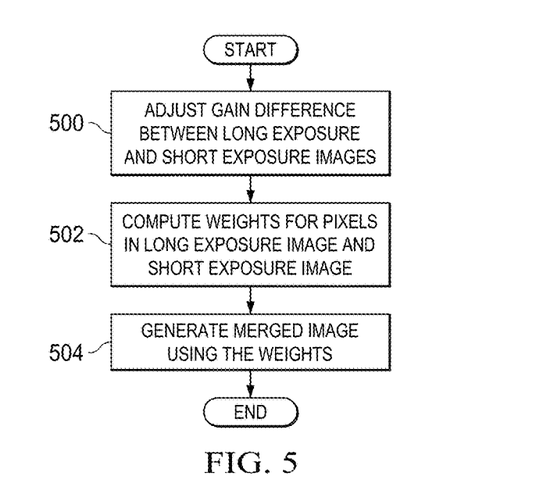
FIG. 5 is a flow diagram of a method for merging a long exposure image and a short exposure image to generate an HDR image.

FIG. 5 is a flow diagram of a method for generating a merged image from corresponding long exposure and short exposure images that may be performed by the merge component 314 of FIG. 3. Initially, the gain difference between the two images is adjusted 500. The amount of gain adjustment for the long exposure image, gain_long, is computed as $$gain\_long=(short\ exposure)/(long\ exposure)$$

where short exposure is the exposure time of the short exposure image and long exposure is the exposure time of the long exposure image. To perform the gain adjustment, the pixels in the long exposure image are multiplied by gain_long.

Per-pixel weights for pixels in the gain-adjusted long exposure image and for pixels in the short exposure image are then computed 502. First, a per-pixel HDR (merging) weight, referred to as alpha(x,y) herein, is computed as per $$\text{alpha}(x, y) = \begin{cases} 1 & L(x, y) > T \\ af \times L(x, y) + bf \times L(x, y) & L(x, y) < T \end{cases}$$

where x and y are pixel coordinates, L is a pixel value in the long exposure image, T is the saturation threshold, and the values of the parameters af and bf are derived based on T as described below.

The value of the saturation threshold T is the value of a maximum saturated pixel after gain_long applied. Assuming the pixel depth of the long exposure image is 16 bits, the value of a maximum saturated pixel is $2^{16}-1=65535$. When gain_long is applied to the long exposure image, the value of a maximum saturated pixel becomes 65535/gain_long. For example, if gain_long=¼, the value of a maximum saturated pixel becomes 65535/4=16383. Thus, T is 16383.

Figure 12:
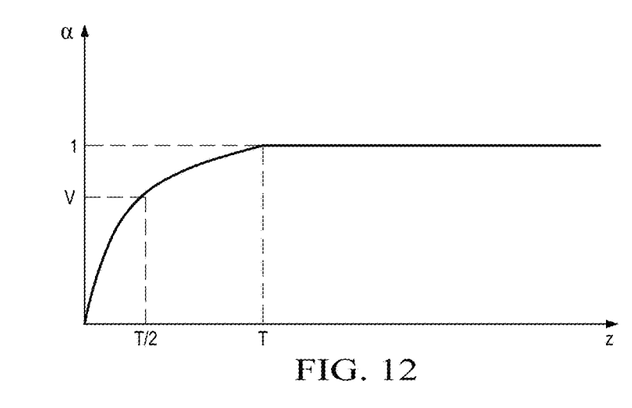
FIG. 12 is a graph illustrating derivation of parameter values for determining merging weights.

FIG. 12 is a graph illustrating the derivation of the values of the parameters af and bf. In this graph, the x-axis is the pixel intensity in the long exposure image and the y axis is gain. The parameter V is a tuning parameter for the derivation, the value of which may be any suitable value between 0 and 1. The particular value of V is implementation dependent and may be determined empirically. The equation for the curve is $$af^2+bf.$$

At z=T/2, the equation for the point on the curve is $$a\left(\frac{T}{2}\right)^2 + b\left(\frac{T}{2}\right) = V$$

and at z=T, the equation for the point on the curve is $$aT^2+bT=1.$$

Solving these equations, $$af = \frac{(2-4V)}{T^2}$$

gives the value of af, and $$bf = \frac{(4V-1)}{T}$$

gives the value of bf.

Figure 7:
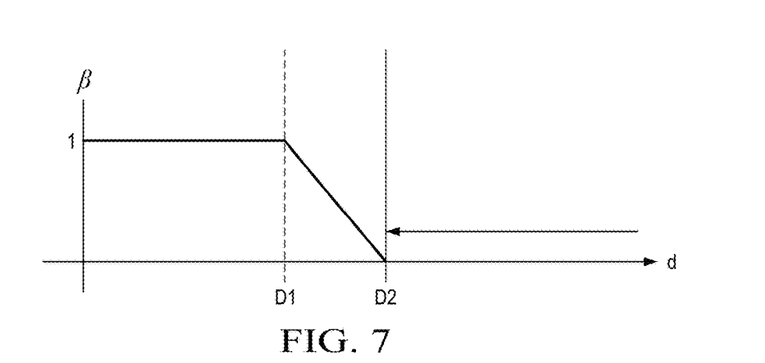
FIG. 7 is a graph illustrating weight calculation for ghosting artifact reduction in a merged image.

Motion adaptation weights, referred to as MAWeight herein, are also computed for ghosting artifact reduction. In some embodiments, a per-pixel motion adaptation weight is computed. In some embodiments, a motion adaptation weight for each pixel is computed based on a block of pixels around the pixel. Using per-pixel motion adaptation weights may be more accurate but computationally expensive while using block-based motion adaption weights may be much faster but less accurate. The motion adaptation weight for a particular pixel location (x,y), MAWeight(x,y), is computed as per $$MAWeight(x, y) = \begin{cases} 1 & D(x, y) < D1 \\ 1 - (D(x, y) - D1) * \text{slope} & D1 \leq D(x, y) \end{cases}$$

where D(x,y) is a computed delta between values of corresponding pixels in the two images. FIG. 7 is a graph illustrating the weight calculation for ghosting artifact reduction. The values of D1 and slope may be determined empirically. When there is motion in the scene, D(x,y) becomes larger, which reduces MAWeight, which then reduces the amount of merging. Less merging helps avoid ghosting artifacts that may occur due to high motion.

For per-pixel ghosting artifact reduction, the value of D(x,y) is computed as $$D(x,y)=|U(x,y)-L(x,y)|$$

where L(x,y) and U(x,y) are corresponding pixels in, respectively, the long exposure image and the short exposure image. For block based ghosting artifact reduction, assuming a block size of N×N where N=2n+1 (n=1, 2, 3, . . . ), the value of D(x,y) is computed as $$D(x,y)=\max_{-n\leq i\leq n}(\max_{-n\leq j\leq n}|U(x+i,y+j)-L(x+i,y+j)|).$$

The value of n is implementation dependent and may be selected as a tradeoff between computation speed and accuracy.

The per-pixel weights for the long exposure image and the short exposure image are computed as per $$\text{Alpha\_L}(x,y)=(1-\text{alpha}(x,y))*\text{MAWeight}(x,y)$$

$$\text{Alpha\_U}(x,y)=1-\text{Alpha\_L}(x,y).$$

The merged (HDR) image is then generated 504 using the per-pixel weights to combine corresponding pixel values from the gain-adapted long exposure image and the gain-adapted short exposure image. More specifically, each pixel M(x,y) of the merged image is computed as per $$M(x,y)=(L(x,y)\times\text{Alpha\_L}(x,y)+U(x,y)\times\text{Alpha\_U}(x,y))$$

where L(x,y) and U(x,y) are corresponding pixels in, respectively, the long exposure image and the short exposure image, Alpha_L(x,y) is the weight for L(x,y), and Alpha_U (x,y) is the weight for U(x,y).

FIG. 6 is a flow diagram of a method for tone mapping of an HDR image that may be performed by the tone mapping component 212 of FIG. 2 or the tone mapping component 316 of FIG. 3. In general, the method takes the 16-bit linear data of the HDR image and adaptively maps the data into a smaller number of bits based on the scene content in the image. The number of bits to which each 16-bit pixel is mapped depends on the bit depth of the ISP 116. For simple of explanation, mapping from 16-bit data to 12-bit data is assumed. One of ordinary skill in the art will understand embodiments in which the smaller data size differs.

As shown in FIG. 6, initially a luminance image of the HDR image is generated 600. In some embodiments, the luminance image is down sampled to improve execution time. The amount of down sampling used is implementation dependent. For example, a Bayer image of size 1280×736 may be reduced to a luminance image of size 160×92.

White point adjustment is then performed 602 on the luminance image. White point adjustment in HDR images is important due to the wide dynamic range. For example, for 16-bit pixel depths, the dynamic range is [0 65535] where black is 0 and white is 65535. If the values of the white pixels in the image are not close to true white, i.e., 65535, low contrast may result in the tone-mapped image. The white point adjustment may be performed as follows. First, a histogram of the pixel values in the image is computed and the whitest pixel value, e.g., 65500, in the image is determined from the histogram. Some small percentage of the whiter pixels with values closest to the whitest pixel value, e.g., 2-5%, is then saturated to white, i.e., the values of these pixels are changed to 65535. Further, after the saturation process, every pixel in the image is scaled by the gain between the whitest original pixel value and true white. The percentage of the whitest pixels to be saturated is an implementation choice.

For example, assume a luminance image of size 160×92 and that 2% of the whiter pixels are to be saturated. The number of pixels in the image is 14720 and 2% is approximately 294 pixels. Approximately 294 pixels are identified for saturation by working backward from the identified whitest pixel value, e.g., 65500, to identify pixels with the next closest value and the next closest value, etc. until the pixel count is approximately 294. For example, suppose there are 100 pixels with a value of 65550, 100 pixels with a next whiter value of 65500, and 100 pixels with a next whiter value of 65495. The values of these 300 pixels are saturated by setting them to be true white, i.e., 65535. Further, every pixel in the image is scaled by the gain between the whitest pixel value identified, 65500, and true white, 65535, i.e., every pixel is multiplied by 65535/65500.

The luminance image is then divided 604 into overlapping blocks and a block mean pixel value is computed 606 for each of the blocks. The block size and the amount of overlap between the blocks is implementation dependent and may be chosen empirically, for example, based on a tradeoff between quality and performance. The block mean pixel value may be computed in any suitable way, e.g., as the average of the pixel values in the block or as a weighted average of the pixel values in the block. If a weighted average is used, the weight for each pixel may be based on the inverse of pixel intensity difference between the center pixel of the block and the pixel.

Figure 9A:
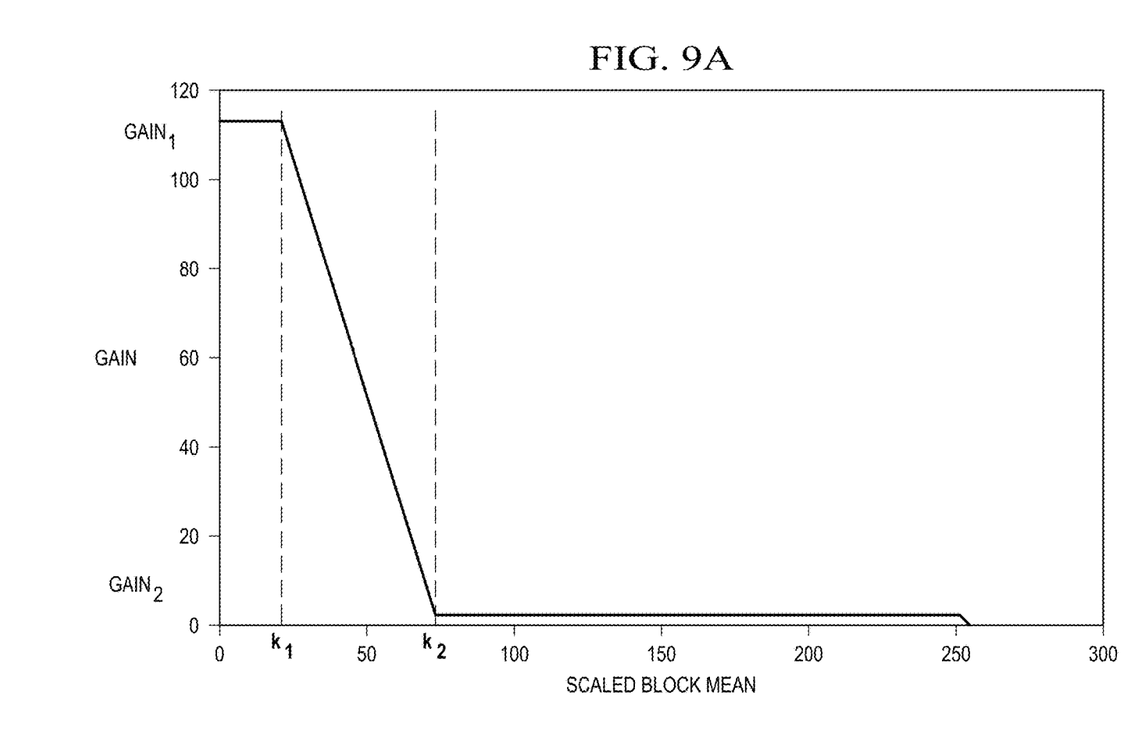
FIGS. 9A and 9B are graphs illustrating generation of local tone curves.
Figure 9B:
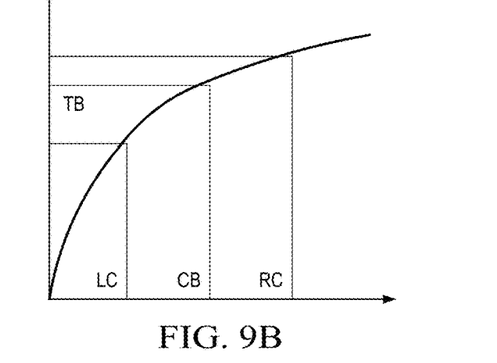

Local tone curves are then computed 608 for each block. These tone curves may be of any suitable length. For simplicity of explanation, the length of each local tone curve is assumed to be 256. One of ordinary skill in the art will understand embodiments with differing tone curve lengths. The computation of a local tone curve of length 256 is illustrated in the graphs of FIGS. 9A and 9B. To compute a tone curve for a block, three points on the curve are determined as illustrated in FIG. 9B. In this figure, CB is the block mean pixel value, TB=CB+delta_brightness is the target brightness, and LC and RC are, respectively, left and right contrast (i.e., the midpoint between 0 and CB and the midpoint between CB and 255, respectively). For purposes of determining the three points of a tone curve, LC=0 and RC=255. Thus, the three points of the local tone curve are [0 0], [CB TB] and [255, 255]. The 256 points on the tone curve are constructed from these three points using band limited interpolation and physicists' Hermite polynomials.

FIG. 9A illustrates the determination of the value of the delta_brightness to be added to the block mean pixel value to determine the target brightness TB. In this graph, the x axis is the block mean pixel value scaled from 16 bits to 8 bits and the y-axis is delta-brightness (gain). As can be seen from this graph, for scaled block mean pixel values less than the first knee point $k_1$, the delta_brightness is the value of $gain_1$. For scaled block mean pixel values larger than the second knee point $k_2$, the delta_brightness is the value of $gain_2$. For scaled block mean pixel values between the two knee points, the value of delta-brightness is chosen along the gain curve between the two knee points. The determination of delta_brightness values for particular block mean pixel values may be implemented as a lookup table (LUT) of 255 values derived based on the values of $k_1$, $k_2$, $gain_1$, and $gain_2$. The knee points and the gains may have any suitable values, which may be selected empirically.

Figure 8:
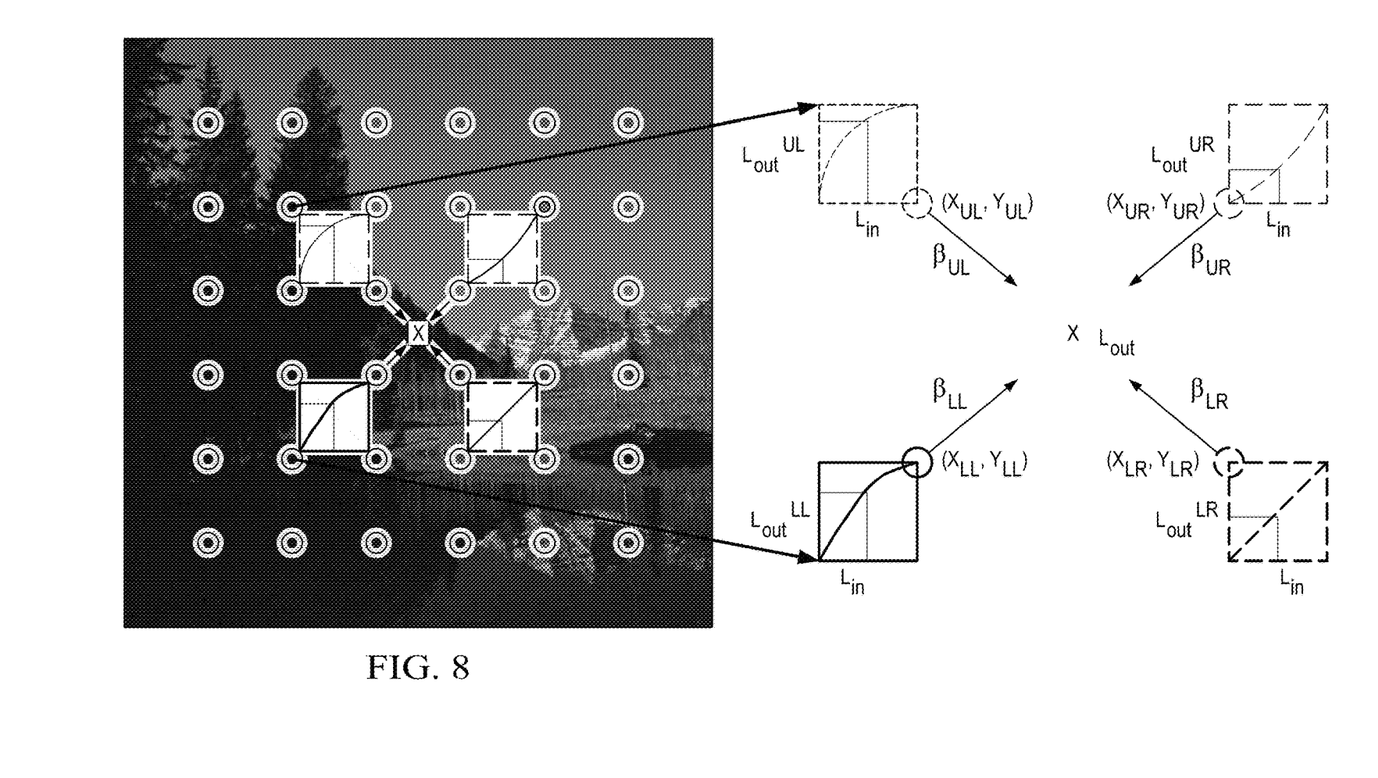
FIG. 8 is an example illustrating local tone mapping.

After the local tone curves are constructed for each block, a gain map is computed 612 using the tone curves and weighted bilateral interpolation. The resulting gain map contains a gain corresponding to each pixel in the luminance image. The gain G(x,y) for a 16-bit luminance pixel X(x,y) in the luminance image with the value L is computed as $$G(x,y)L_{out}/L$$

where $L_{out}$ is computed as a weighted sum of applying the tone curves of the four blocks having center points closest to $X(x,y)$ to L. The four block centers closest to $X(x,y)$ are referred to as the upper-left (UL) point, the upper-right (UR) point, the lower-left (LL) point, and the lower-right (LR) point herein. FIG. 8 is an example illustrating the locations of the center points relative to $X(x,y)$. Each of the small circles in the image is a center point of a block. For odd block sizes, the center point is the center pixel in the block. For even block sizes, the center point is between the four center pixels in the block.

More specifically, $L_{out}$ is computed as per $$L_{out} = \beta^{UL} L_{out}^{UL} + \beta^{UR} L_{out}^{UR} + \beta^{LL} L_{out}^{LL} + \beta^{LR} L_{out}^{LR}$$

where $L_{out}^{NN}$ is the result of applying the tone curve of the block containing the NN neighboring center point of $X(x,y)$ and $\beta^{NN}$ is a weight computed for this result, where NN={UL, UR, LL, LR}.

The value of $L_{out}^{NN}$ is computed as per $$L_{out}^{NN} = \frac{LUT[L_{floor}]^{NN} W_{ceil} + LUT[L_{ceil}]^{NN} W_{floor}}{W_{ceil} + W_{floor}}$$

where $LUT^{NN}$ is the tone mapping lookup table for the block containing the NN neighboring center point and $L_{floor}$, $L_{ceil}$, $W_{floor}$, and $W_{ceil}$ are computed as follows. The floor and ceiling values of L are computed as per $$L_{floor} = \frac{L}{256}; 0 \leq L_{floor} < 254$$

$$L_{ceil} = L_{floor} + 1; 1 \leq L_{floor} < 255$$

and the floor and ceiling weights are computed as per $$W_{floor} = L - L_{floor} * 256$$

$$W_{ceil} = L_{ceil} * 256 - L.$$

The value of $\beta^{NN}$ is computed as per $$\beta^{NN} = \alpha_{dw}^{NN} \alpha_{iw}^{NN}; 0 \leq \alpha_{dw}^{NN}, \alpha_{iw}^{NN} \leq 1$$

where $\alpha_{dw}^{NN}$ is a distance weight based on the distance from the NN neighboring center point to the pixel $X(x,y)$ and $\alpha_{iw}^{NN}$ is an intensity weight based on the difference in intensity between the mean pixel value of the block containing the NN neighboring center point and L.

Figure 10A:
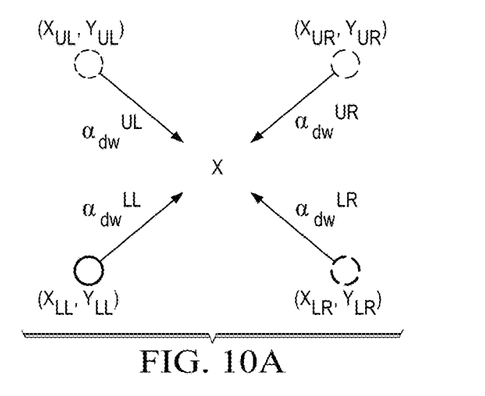
FIGS. 10A, 10B, and 10C are examples illustrating computation of distance weights and pixel intensity weights for local tone mapping.

Assuming that that the block size is odd and the center point is the center pixel of the block, the distance weight $\alpha_{dw}^{NN}$ is computed as per $$\alpha_{dw}^{NN} = |x - x_{NN}||y - y_{NN}|/\lambda$$

where $(x_{NN}, y_{NN})$ are the coordinates of the NN neighboring center point and $\lambda$ is a normalization factor to scale the distance weight to be between 0 and 1 inclusive. If the block size is even, the center point is located between the four center pixels of the block, and the distance weight is computed based on the distances from the pixel $X(x,y)$ to each of these four center pixels.

Figure 10B:
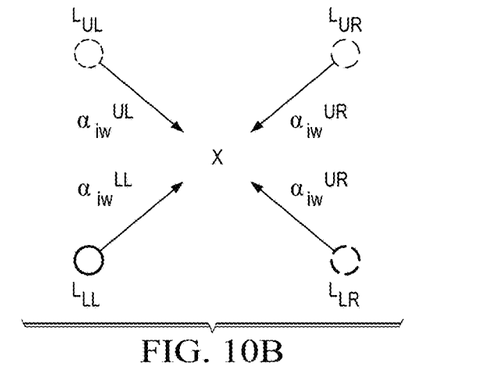
Figure 10C:
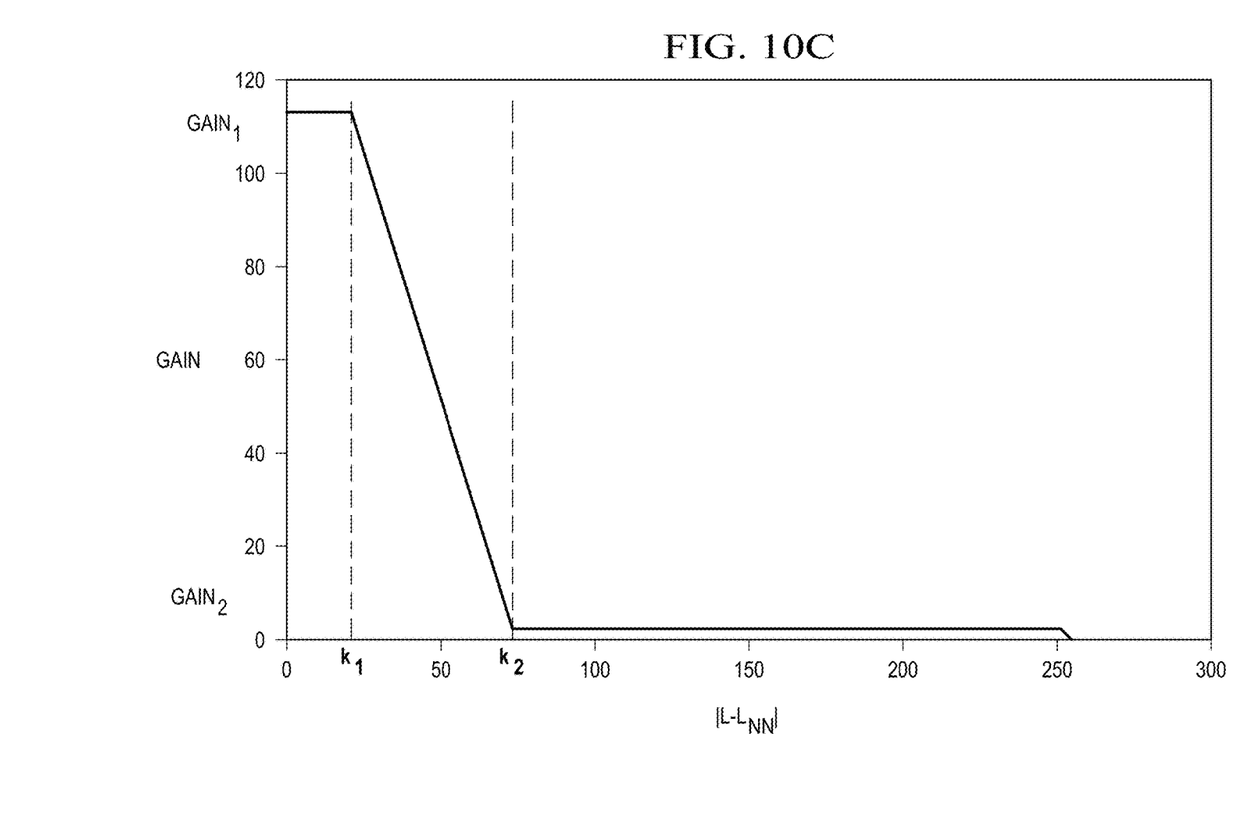

The intensity weight $\alpha_{iw}^{NN}$ is computed as per $$\alpha_{iw}^{NN} = LUT[|L - L_{NN}|]$$

where $L_{NN}$ is the mean pixel value of the block containing the NN neighboring center point and the LUT is derived as per the graph of FIG. 10C. FIGS. 10A and 10B are examples illustrating, respectively, the computation of the distance weights and the intensity weights for $X(x,y)$. In the graph of FIG. 10C, the x axis is $|L - L_{NN}|$ and the y-axis is the intensity weight (gain). As can be seen from this graph, for values of $|L - L_{NN}|$ less than the first knee point $k_1$, the intensity weight is the value of $gain_1$. For values of $|L - L_{NN}|$ larger than the second knee point $k_2$, the intensity weight is the value of $gain_2$. For values of $|L - L_{NN}|$ between the two knee points, the intensity weight is chosen along the gain curve between the two knee points. The determination of intensity weights for particular values of $|L - L_{NN}|$ may be implemented as a lookup table (LUT) of 255 values derived based on the values of $k_1$, $k_2$, $gain_1$, and $gain_2$. The knee points and the gains may have any suitable values, which may be selected empirically. In some embodiments, the values of the knee points and the gains are the same as those used to generate the LUT for determining the value of delta_brightness for particular block mean pixel values.

Referring again to FIG. 6, once the gain map is computed, the gains are applied 612 to the four Bayer channels of the HDR image. In embodiments where the luminance image is downsampled, the gain map may be upsampled to the original HDR image resolution. The gains may be applied to the four Bayer components of the corresponding pixels in the HDR image as per $$R\text{bayer}(x,y) = G(x,y) \times R\text{bayer}(x,y)$$

$$Gr\text{bayer}(x,y) = G(x,y) \times Gr\text{bayer}(x,y),$$

$$Gb\text{bayer}(x,y) = G(x,y) \times Gb\text{bayer}(x,y)$$

$$B\text{bayer}(x,y) = G(x,y) \times B\text{bayer}(x,y).$$

Figure 11:
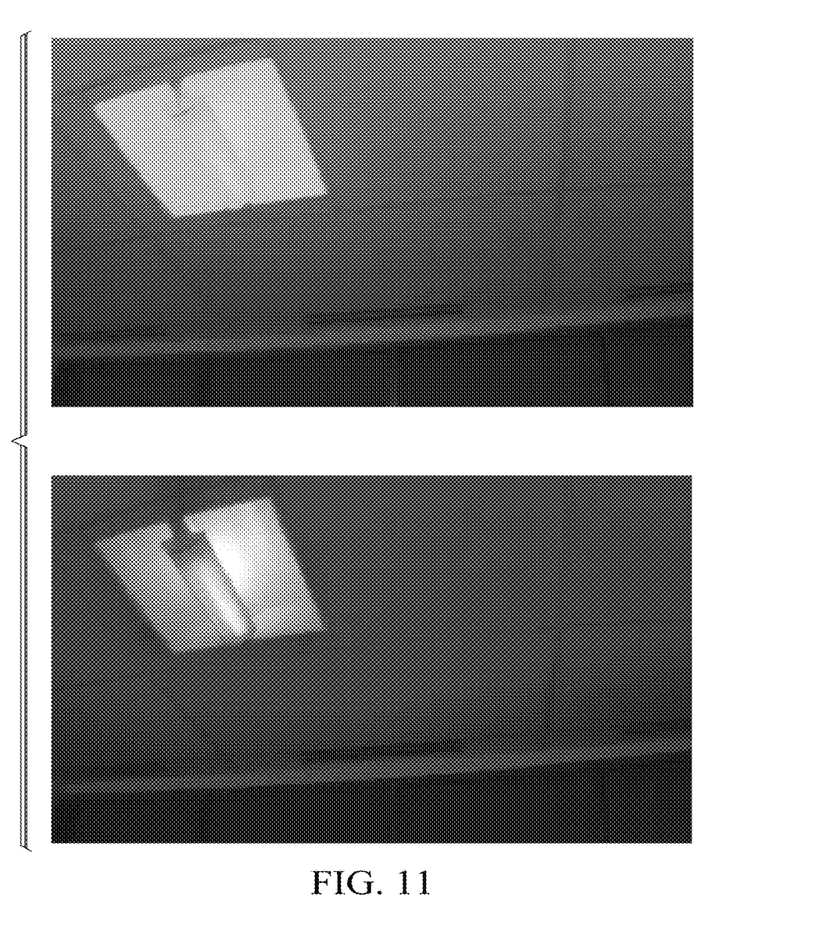
FIG. 11 is an example of applying local tone mapping to an HDR image.

FIG. 11 is an example showing the effect of applying the above local tone mapping to an HDR image. The top image is the original 16-bit HDR image converted to a 12-bit image without tone mapping and the bottom image is the HDR image with local tone mapping applied. Note the improvement in brightness and contrast when the local tone mapping is applied.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the local tone mapping applied to each pixel of an HDR image is based on four neighboring blocks of the pixel. One of ordinary skill in the art will understand embodiments of the invention in which more or fewer blocks may be used.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of generating a high dynamic range (HDR) image, the method comprising:
    receiving, by one or more processors from an HDR sensor module, a long exposure image of a scene;
    receiving, by the one or more processors from the HDR sensor module, a short exposure image of the scene;
    computing, by the one or more processors, a merging weight for a pixel location of the long exposure image by comparing a pixel value at the pixel location of the long exposure image to a saturation threshold;
    computing, by the one or more processors, a motion adaptation weight for the pixel location of the long exposure image based on a delta between a pixel value of the pixel location in the long exposure image and a pixel value of the pixel location in the short exposure image;
    computing, by the one or more processors, a long exposure weight based the motion adaptation weight and the merging weight for the pixel location of the long exposure image;
    computing, by the one or more processors, a short exposure weight by subtracting the long exposure weight for the pixel location in the long exposure image from one;
    computing, by the one or more processors, a pixel value for the pixel location of the HDR image to be a sum of the pixel value of the long exposure image weighted by the long exposure weight and the pixel value of the short exposure image weighted by the short exposure weight, generating a merged HDR image comprising N bit data;
    adaptively mapping, by the one or more processors, the HDR image, generating an output HDR image having M bit data, wherein M is less than N; and
    outputting, by the one or more processors to a display device, the output HDR image.

2. The method of claim 1, wherein computing the motion adaptation weight comprises:
    computing the motion adaptation weight for the pixel location of the long exposure image based on deltas between pixel values of a block of pixel locations around the pixel location in the long exposure image and pixel values of a corresponding block of pixel locations around the pixel location in the short exposure image.

3. The method of claim 1, further comprising:
    adjusting a gain difference between the long exposure image and the short exposure image.

4. The method of claim 1, further comprising:
    performing black level adjustment on the long exposure image and the short exposure image; and
    performing white balancing on the long exposure image and the short exposure image.

5. The method of claim 1, wherein the saturation threshold is a threshold indicative of a maximum saturated pixel value.

6. An apparatus configured to generate a high dynamic range (HDR) image, the apparatus comprising:
    one or more processors; and
    a non-transitory computer readable storage medium storing a program for execution by the one or more processors, the program including instructions to:
    receive, from an HDR sensor module, a long exposure image of a scene;
    receive, from the HDR sensor module, a short exposure image of the scene;
    perform black level adjustment on the long exposure image and the short exposure image;
    perform white balancing on the long exposure image and the short exposure image;
    compute a merging weight for a pixel location of the long exposure image by comparing a pixel value at the pixel location of the long exposure image to a saturation threshold;
    compute a motion adaptation weight for the pixel location of the long exposure image, based on a delta between a pixel value of the pixel location in the long exposure image and a pixel value of the pixel location in the short exposure image;
    compute a long exposure weight based on the motion adaptation weight and the merging weight for the pixel location of the long exposure image;
    compute a short exposure weight based on the long exposure weight;
    compute a pixel value for the pixel location of the HDR image to be a sum of the pixel value of the long exposure image weighted by the long exposure weight and the pixel value of the short exposure image weighed by the short exposure weight, to generate a merged HDR image comprising N bit data;
    adaptively map the HDR image to generate an output HDR image having M bit data, wherein M is less than N; and
    output, to a display device, the output HDR image.

7. The apparatus of claim 6, wherein the instructions further comprise instructions to:
    compute the short exposure weight for the short exposure image by subtracting the long exposure weight for the pixel location in the long exposure image from one.

8. The apparatus of claim 7, wherein the instructions further comprise instructions to compute the motion adaptation weight for the pixel location of the long exposure image based on deltas between pixel values of a block of pixel locations around the pixel location in the long exposure image and pixels values of a corresponding block of pixel locations around the pixel location in the short exposure image.

9. The apparatus of claim 6, wherein the instructions further comprise instructions to:
    adjust a gain difference between the long exposure image and the short exposure image.

10. A non-transitory computer-readable storage medium storing a program for execution by one or more processors, for generating a high dynamic range (HDR) image, the program including instructions to:
    receive, from an HDR sensor module, a long exposure image of a scene;
    receive, from the HDR sensor module, a short exposure image of the scene;
    compute a merging weight for each pixel location of the long exposure image by comparing a pixel value at the pixel location of the long exposure image to a saturation threshold;
    compute a motion adaptation weight for the pixel location of the long exposure image based on a delta between a pixel value of the pixel location in the long exposure image and a pixel value of the pixel location in the short exposure image;
compute a long exposure weight based on the motion adaptation weight and the merging weight for the pixel location of the long exposure image;
compute a short exposure weight based on the long exposure weight bar subtracting the long exposure weight for the pixel location in the long exposure image from one;
compute a pixel value for the pixel location of the HDR image to be a sum of the pixel value of the long exposure image weighted by the long exposure weight and the pixel value of the short exposure image weighted by the short exposure weight, to generate a merged HDR image comprising N bit data;
adaptively map the HDR image to generate an output HDR image having M bit data, wherein M is less than N; and
output, to a display device, the output HDR image.

11. The non-transitory computer-readable storage medium of claim 10, wherein the instructions include instructions to:
compute the motion adaptation weight for the pixel location of the long exposure image based on a delta between a pixel value of the pixel location in the long exposure image and a pixel value of the pixel location in the short exposure image.

12. The non-transitory computer-readable storage medium of claim 10, wherein the instructions include instructions to:
compute the motion adaptation weight for the pixel location of the long exposure image based on deltas between pixel values of a block of pixel locations around the pixel location in the long exposure image and pixels values of a corresponding block of pixel locations around the pixel location in the short exposure image.

13. The non-transitory computer-readable storage medium of claim 10, wherein the instructions further comprise instructions to:
adjust a gain difference between the long exposure image and the short exposure image.

14. The non-transitory computer-readable storage medium of claim 10, wherein the instructions further comprise instructions to:
perform black level adjustment on the long exposure image and the short exposure image; and
perform white balancing on the long exposure image and the short exposure image.

15. The non-transitory computer-readable storage medium of claim 10, wherein the saturation threshold is a maximum saturated pixel value.

* * * * *